(12) United States Patent
Ishikawa

(10) Patent No.: US 8,914,806 B2
(45) Date of Patent: Dec. 16, 2014

(54) INFORMATION PROCESSING APPARATUS AND VIRTUAL STORAGE MANAGEMENT METHOD, AND STORAGE MEDIUM FOR RESTRICTION ON PROCESS SWAPPING BASED ON PROCESS ATTRIBUTES AND PROCESSOR UTILIZATION

(75) Inventor: Akira Ishikawa, Machida (JP)

(73) Assignee: Canon Kabushiki Kaisha (JP)

( * ) Notice: Subject to any disclaimer, the term of this patent is extended or adjusted under 35 U.S.C. 154(b) by 755 days.

(21) Appl. No.: 12/712,117

(22) Filed: Feb. 24, 2010

(65) Prior Publication Data

US 2010/0217959 A1 Aug. 26, 2010

(30) Foreign Application Priority Data

Feb. 25, 2009 (JP) ................................. 2009-042224

(51) Int. Cl.
| | |
|---|---|
| G06F 9/38 | (2006.01) |
| G06F 12/02 | (2006.01) |
| G06F 12/12 | (2006.01) |
| G06F 9/48 | (2006.01) |
| G06F 9/52 | (2006.01) |

(52) U.S. Cl.
CPC ................ *G06F 12/126* (2013.01); *G06F 9/38* (2013.01); *G06F 9/4818* (2013.01); *G06F 9/4843* (2013.01); *G06F 9/4881* (2013.01); *G06F 9/52* (2013.01)
USPC ........... 718/106; 718/102; 718/103; 718/107; 718/108; 711/170; 711/173; 712/216

(58) Field of Classification Search
CPC ........... G06F 9/38; G06F 9/52; G06F 9/4881; G06F 9/4843; G06F 9/4818; G06F 12/126
USPC .......... 718/106, 107, 102, 103, 108; 711/170, 711/173; 712/216
See application file for complete search history.

(56) References Cited

U.S. PATENT DOCUMENTS

| | | | | |
|---|---|---|---|---|
| 6,728,962 | B1* | 4/2004 | Chalmer et al. | 718/108 |
| 7,185,185 | B2* | 2/2007 | Joy et al. | 712/228 |
| 7,269,831 | B2* | 9/2007 | Tanaka et al. | 718/108 |
| 7,958,370 | B2* | 6/2011 | Hirai et al. | 713/189 |
| 8,132,107 | B2* | 3/2012 | Honma | 715/740 |
| 8,151,274 | B2* | 4/2012 | Abe | 718/107 |

(Continued)

FOREIGN PATENT DOCUMENTS

| | | |
|---|---|---|
| JP | 2000200219 A * | 7/2000 |
| JP | 2004-227188 A | 8/2004 |

*Primary Examiner* — Meng An
*Assistant Examiner* — Abu Ghaffari
(74) *Attorney, Agent, or Firm* — Rossi, Kimms & McDowell LLP

(57) ABSTRACT

A virtual storage management method that can increase the overall processing speed while preventing a processor from being overloaded. A request for acquisition of a memory area in a primary storage device is received from a process executed by a processor. It is determined whether or not the process that has made the acquisition request is a utility process executable in cooperation with another process. Control is provided so as to restrict swap-out of the utility process when it is determined that the process that has made the received acquisition request is a utility process executable in cooperation with another process, and a process cooperating with the utility process executed by the processor is a preferred process of which swap-out is restricted, and a processor utilization of the preferred process is greater than a predetermined value.

7 Claims, 6 Drawing Sheets

(56) References Cited

U.S. PATENT DOCUMENTS

| | | | |
|---|---|---|---|
| 8,281,314 B2* | 10/2012 | Ando et al. | 718/106 |
| 8,438,572 B2* | 5/2013 | Fecioru | 718/103 |
| 2004/0060052 A1* | 3/2004 | Brown et al. | 718/107 |
| 2005/0007614 A1* | 1/2005 | Kishigami | 358/1.13 |
| 2006/0015585 A1* | 1/2006 | Okada | 709/219 |
| 2008/0104602 A1* | 5/2008 | Takeuchi | 718/103 |

* cited by examiner

FIG.4

PRIORITY TABLE 103

| PROCESS NAME | ATTRIBUTE | RELATED PREFERRED PROCESS | LOAD THRESHOLD |
|---|---|---|---|
| FAX RECEPTION | NORMAL | | |
| COPY | PREFERRED | | |
| PRINT | UTILITY | COPY | 80% |

INFORMATION PROCESSING APPARATUS AND VIRTUAL STORAGE MANAGEMENT METHOD, AND STORAGE MEDIUM FOR RESTRICTION ON PROCESS SWAPPING BASED ON PROCESS ATTRIBUTES AND PROCESSOR UTILIZATION

BACKGROUND OF THE INVENTION

1. Field of the Invention

The present invention relates to an information processing apparatus and a virtual storage management method that virtually store processes using a primary storage device and a secondary storage device in the information processing apparatus, as well as a computer-readable storage medium storing a program for implementing the method.

2. Description of the Related Art

Conventionally, there has been known a virtual storage management method that uses a virtual storage system and controls swap of memory areas in multifunction peripherals such as an image processing apparatus having a variety of functions such as copying, printing, and faxing, and information processing apparatuses such as a computer system.

In the method using the virtual storage system, a memory area not less than the memory capacity of real memory in a primary storage device can be managed using a secondary storage device. In the case where a memory area not less than the memory capacity of real memory is used, swap processing is carried out in which contents of the memory area are temporarily saved (swapped out) in a storage area of, for example, an HDD (hard disk drive) as the secondary storage device.

At a time of execution of a process, when the memory area from which the process has been swapped out is to be used again, the process is transferred again from a storage area of the secondary storage device to a memory area of the real memory. Thus, for a process using the memory area from which the process has been swapped out, the start of an operation delays due to transfer overhead.

There has been known a technique to preferentially subject a memory area for a process that has already been swapped out partially to swap-out so that throughput of an apparatus as a whole can be enhanced (Japanese Laid-Open Patent Publication (Kokai) No. 2004-227188).

Incidentally, the function of excluding a specific memory area from swap-out is adopted in general-purpose operating systems such as Linux (registered trademark). Even in a system having a small amount of memory, by inhibiting swap-out of a memory area used by a process required to be preferentially executed, guaranteed operation of an emergent process and preferred execution of an important function can be realized.

In information processing apparatuses such as a digital multifunction peripheral, the number of programs (processes) installed has been increasing because the variety of functions has been increasing year after year. Such a device configuration as to reserve a large amount of memory area that does not require swap even when all the processes are concurrently executed is not realistic from the viewpoint of costs. Thus, it is necessary to swap out the contents in memory areas used by any process.

By inhibiting swap-out of processes executed frequently so that they can be preferentially executed, the throughput of the system as a whole can be enhanced.

Here, "memory priorities" that are degrees to which processes are not subjected to swap-out (degrees to which processes are preferentially remained in real memory) are given depending on types of processes. Specifically, attributes are sorted into normal processes and preferred processes that are more preferentially executed as compared with normal processes and not subjected to swap-out. A process that may be executed in cooperation with another process is referred to as a utility process. Among utility processes, the memory priorities of those which are executable in cooperation with either normal processes or preferred processes cannot be determined across the board.

Specifically, if memory priorities of utility processes are excessively lowered across the board, portions of their related preferred processes which cooperate with the utility processes are swapped out in many cases. For this reason, swap processing occurs frequently, which slows execution of the preferred processes.

On the other hand, if priorities of utility processes are excessively raised across the board, portions of their related normal processes which cooperate with the utility processes are remained in real memory in many cases. For this reason, the priorities of normal processes needlessly rise.

There is a limit on the number of processes that can be executable by a CPU (processor) per unit time, and hence when an attempt is made to preferentially execute a multitude of processes, the number of processes desired to be preferentially executed exceeds the limited number of executable processes. Namely, the CPU is overloaded, and so-called exhaustion of CPU resources occurs. When exhaustion of CPU resources occurs, waiting times for processing and so on are prolonged, which slows processing in the system as a whole, and will eventually slow execution of processes that should be truly preferred.

As described above, merely by determining priorities of utility processes across the board, the overall processing speed of the system may decrease depending on the situation.

SUMMARY OF THE INVENTION

The present invention provides an information processing apparatus and a virtual storage management method that can increase the overall processing speed while preventing a processor from being overloaded, as well as a computer-readable storage medium storing a program for implementing the method.

Accordingly, in a first aspect of the present invention, there is provided an information processing apparatus that includes a processor capable of executing a plurality of processes, a primary storage device, and a secondary storage device, comprising an receiving unit adapted to receive an acquisition request for a memory area in the primary storage device from a process executed by the processor, a determining unit adapted to determine whether the process that has made the acquisition request received by the receiving unit is a utility process executable in cooperation with another process, and a control unit adapted to provide control so as to restrict swap-out of the utility process when the determining unit determines that the process that has made the acquisition request received by the receiving unit is a utility process executable in cooperation with another process, and a process cooperating with the utility process executed by the processor is a preferred process of which swap-out is restricted, and a processor utilization of the preferred process is greater than a predetermined value.

Accordingly, in a second aspect of the present invention, there is provided a virtual storage management method in an information processing apparatus that includes a processor capable of executing a plurality of processes, a primary storage device, and a secondary storage device, comprising an receiving step of receiving an acquisition request for a memory area in the primary storage device from a process executed by the processor, a determining step of determining whether the process that has made the acquisition request received in the receiving step is a utility process executable in cooperation with another process, and a control step of providing control so as to restrict swap-out of the utility process when it is determined in the determining steps that the process that has made the acquisition request received in the receiving step is a utility process executable in cooperation with another process, and a process cooperating with the utility process executed by the processor is a preferred process of which swap-out is restricted, and a processor utilization of the preferred process is greater than a predetermined value.

Accordingly, in a third aspect of the present invention, there is provided a computer-readable storage medium storing a program for causing a computer to execute a virtual storage management method.

According to the present invention, it is possible to increase the overall processing speed while preventing a processor from being overloaded.

Further features of the present invention will become apparent from the following description of exemplary embodiments (with reference to the attached drawings).

BRIEF DESCRIPTION OF THE DRAWINGS

FIG. 4 is a view showing contents of a priority table.

DESCRIPTION OF THE EMBODIMENTS

The present invention will now be described in detail with reference to the drawings showing an embodiment thereof.

In the following description, it is assumed that an information processing apparatus is an image processing apparatus, but this is only an example, and a virtual storage management method according to the present invention may be applied to general computer systems. Specifically, the present invention may be applied to any information processing apparatuses that carry out processes under the control of a CPU (processor), and virtually store processes using a primary storage device and a secondary storage device. Thus, any distinction is not made according to functions which information processing apparatuses have.

Figure 1:
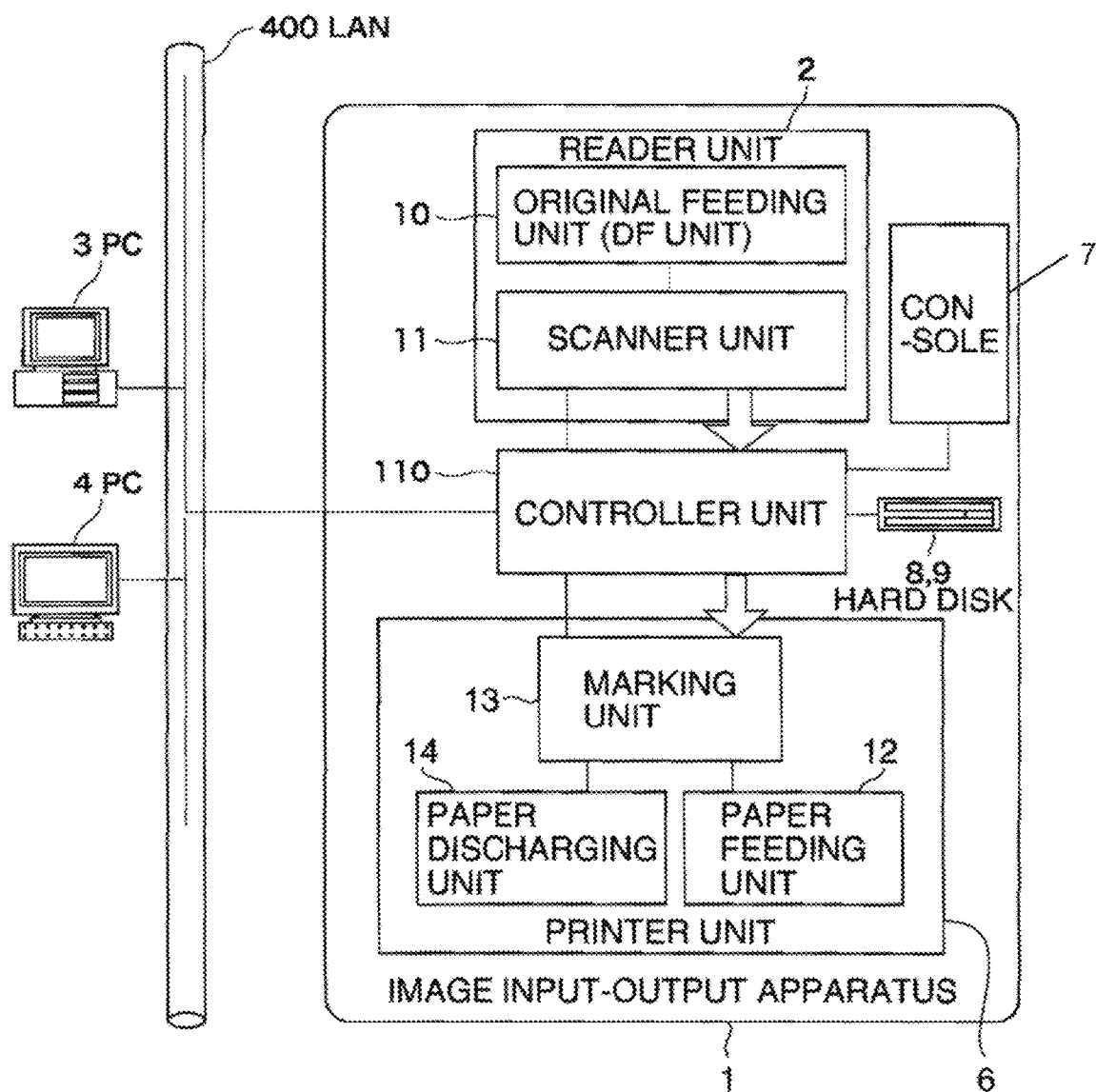
FIG. 1 is a block diagram schematically showing an arrangement of an image input-output apparatus as an information processing apparatus to which a virtual storage management method according to an embodiment of the present invention is applied.

FIG. 1 is a block diagram schematically showing an arrangement of an image input-output apparatus as an information processing apparatus to which a virtual storage management method according to an embodiment of the present invention is applied.

The image input-output apparatus 1 is connected to host computers (PC) 3 and 4 via a LAN (local area network) 400 such as Ethernet (registered trademark). The image input-output apparatus 1 has a reader unit 2 that carries out processing to read image data, a printer unit 6 that carries out processing to output image data, and a controller unit 110. Further, the image input-output apparatus 1 has a console 7 having a liquid crystal panel that displays image data, various functions, and so on, and hard disk drives (HDD) 8 and 9 in which control programs, image data, and so on are written in advance. The above component elements are connected to and controlled by the controller unit 110.

The reader unit 2 has an original feeding unit 10 that conveys originals, and a scanner unit 11 that optically reads an image on an original and converts the same into image data as an electric signal. The printer unit 6 has a paper feeding unit 12 that has a plurality of paper cassettes accommodating recording paper, and a marking unit 13 that transfers and fixes image data on recording paper. The printer unit 6 also has a paper discharging unit 14 that carries out sort processing and staple processing on printed recording paper and externally discharges the same.

Figure 2:
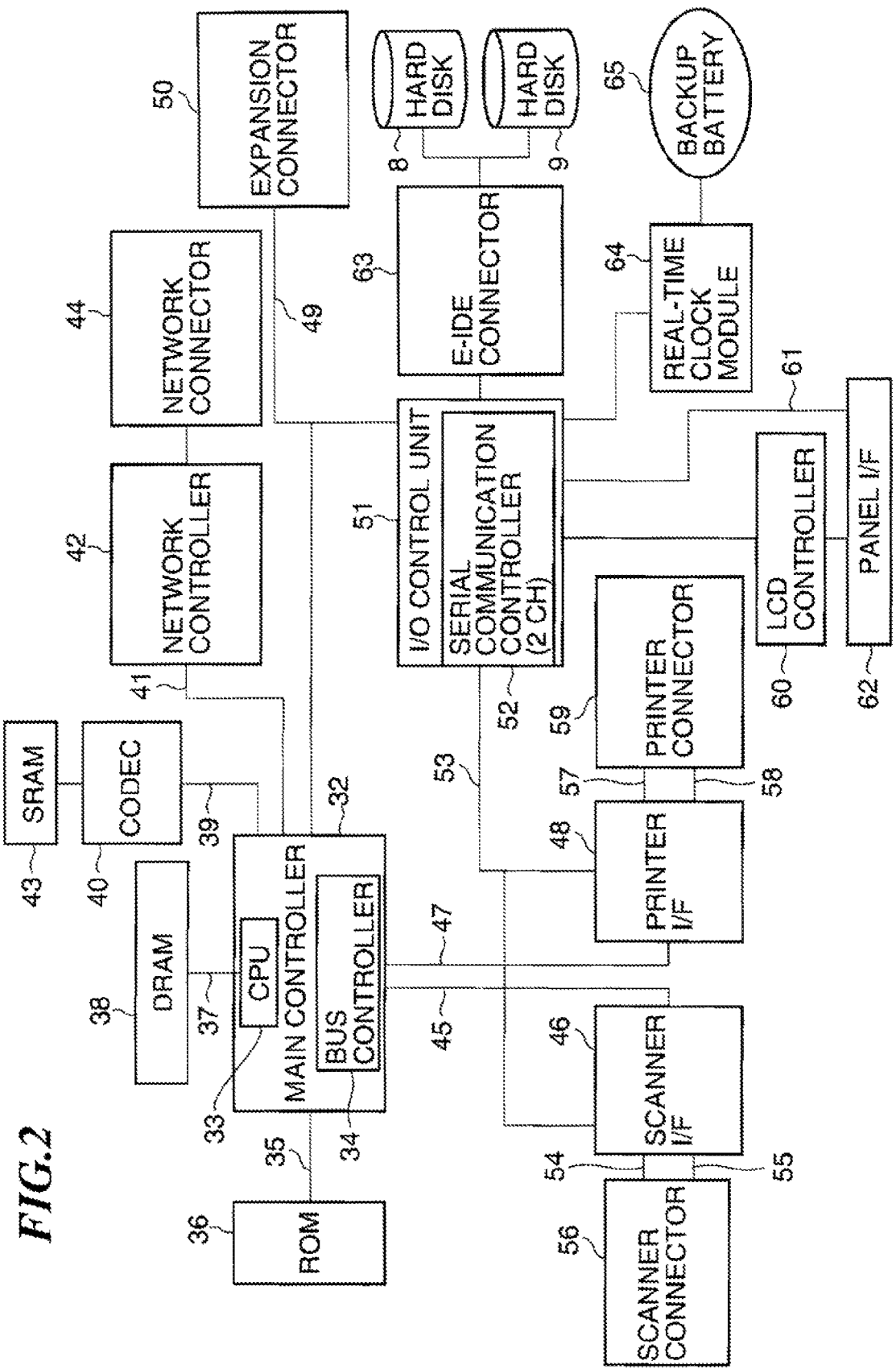
FIG. 2 is a block diagram schematically showing in detail an arrangement of a controller unit.

FIG. 2 is a block diagram schematically showing in detail an arrangement of the controller unit 110.

The controller unit 110 has a main controller 32. The main controller 32 has a CPU (processor) 33, a bus controller 34, and functional blocks including various control circuits, described later, incorporated therein.

The controller unit 110 has a ROM 36 connected thereto via a ROM I/F (interface) 35, and also has a DRAM 38 connected thereto via a DRAM I/F 37. Further, the controller unit 110 has a codec 40 connected thereto via a codec I/F 39, and also has a network controller 42 connected thereto via a network I/F 41.

The ROM 36 stores various control programs and computation data executed by the CPU 33 of the main controller 32. The DRAM 38 is used as a work area for operation of the CPU 33, and an area for saving image data. The DRAM 38 stores various tables. The codec 40 compresses raster image data accumulated in the DRAM 38 using a well-known compression method such as MH, MR, MMR, or JBIG, and decompresses the compressed data into raster images.

The codec 40 has an SRAM 43 connected thereto, and the SRAM 43 is used as a temporary work area for the codec 40. The network controller 42 carries out predetermined control processing between the controller unit 110 and a LAN 400 via a network connector 44. The main controller 32 is connected to a scanner I/F 46 via a scanner bus 45, and connected to a printer I/F 48 via a printer bus 47.

The main controller 32 is further connected to an expansion connector 50 for connecting with an expansion board, and an input-output control unit (I/O control unit) 51 via a universal high-speed bus 49 such as a PCI bus. The input-output control unit (I/O control unit) 51 is equipped with a two-channel asynchronous serial communication controller 52 for sending and receiving control commands to and from the reader unit 2 and the printer unit 6. The scanner I/F 46 and the printer I/F 48 are connected to the serial communication controller 52 via an I/O bus 53.

The scanner I/F 46 is connected to a scanner connector 56 via a first asynchronous serial I/F 54 and a first video I/F 55, and the scanner connector 56 is connected to the scanner unit 11 of the reader unit 2 (FIG. 1). The scanner I/F 46 carries out desired binary-coding processing and zooming processing in the main scanning direction and/or the sub-scanning direction on image data received from the scanner unit 11. Also, the scanner I/F 46 generates a control signal based on a video signal sent from the scanner unit 11, and transfers the same to the main controller 32 via the scanner bus 45.

The printer I/F 48 is connected to a printer connector 59 via a second asynchronous serial I/F 57 and a second video I/F 58, and the printer connector 59 is connected to the marking unit 13 of the printer unit 6 (FIG. 1).

The printer I/F 48 carries out smoothing processing on image data outputted from the main controller 32, and outputs the image data to the marking unit 13. Further, the printer I/F 48 transfers a control signal generated based on a video signal, which is sent from the marking unit 13, to the main controller 32 via the printer bus 47.

The CPU 33 of the main controller 32 operates in accordance with a control program loaded from the ROM 36 via the ROM I/F 35. For example, the CPU 33 interprets PDL (page description language) data received from the host computers 3 and 4 (FIG. 1), and expands the same into raster image data.

Also, the bus controller 34 controls transfer of data inputted from and outputted to external devices connected to the scanner I/F 46, the printer I/F 48, and the expansion connector 50, and so on, and controls arbitration at the time of bus contention and transfer of DMA data. For example, transfer of data between the above described DRAM 38 and the codec 40, transfer of data from the scanner unit 11 to the DRAM 38, transfer of data from the DRAM 38 to the marking unit 13, and so on are controlled by the bus controller 34 so that they can be DMA transferred.

A panel I/F 62 is connected to the I/O control unit 51 via an LCD controller 60 and a key input I/F 61, and the console 7 (FIG. 1) is connected to the panel I/F 62. The I/O control unit 51 is connected to an EEPROM, not shown, as a nonvolatile memory area. The I/O control unit 51 is also connected to the hard disk drives (HDDs) 8 and 9 via an E-IDE connector 63. The I/O control unit 51 is further connected to a real-time clock module 64 that updates/stores the date and time managed within the apparatus. The real-time clock module 64 is connected to a backup battery 65 and backed up by the backup battery 65.

In the present embodiment, the controller unit 110 acts as a virtual storage management apparatus that realizes the virtual storage management method. The DRAM 38 acts as a primary storage device. The hard disk drives (HDDs) 8 and 9 act as a secondary storage device. The memory management unit 102 acts as a receiving unit, a determining unit, and a control unit.

Figure 3:
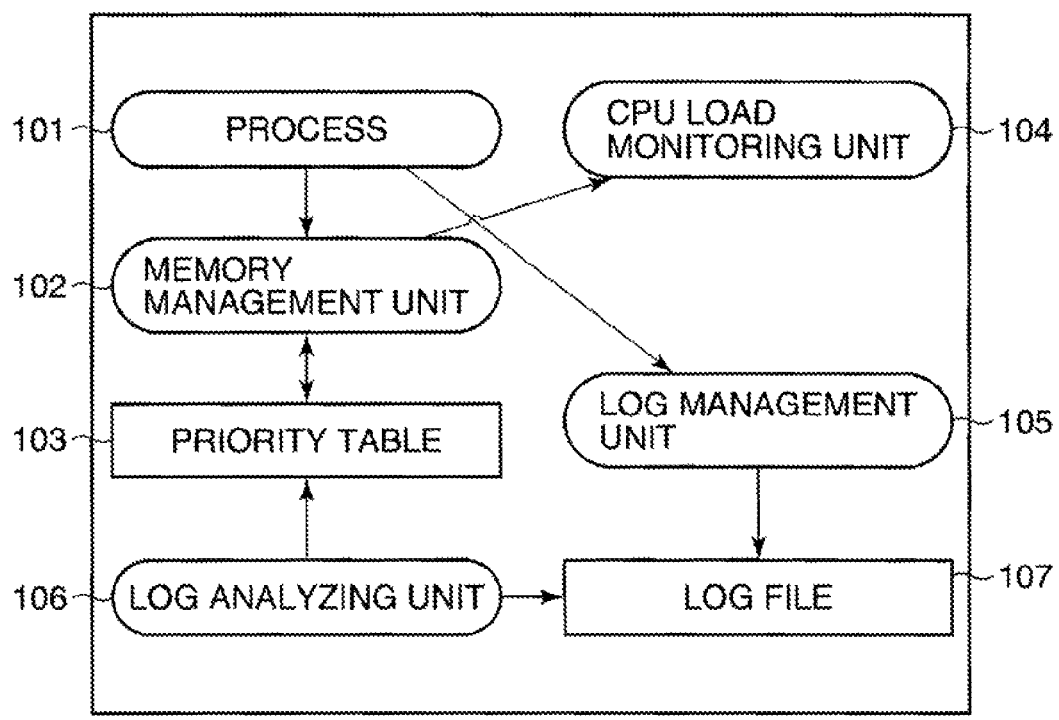
FIG. 3 is a block diagram schematically showing an arrangement of modules required for the controller unit to carry out memory management.

FIG. 3 is a block diagram schematically showing an arrangement of a module required for the controller unit 110 to carry out memory management. The module includes a process 101, a memory management unit 102, a priority table 103, a CPU load monitoring unit 104, a log management unit 105, a log analysis unit 106, and a log file 107.

The process 101, the memory management unit 102, and the CPU load monitoring unit 104 are programs stored in advance in the ROM 36 or the hard disk drives (HDD) 8 and 9 (see FIG. 2). At the execution of these programs, the CPU 33 reads them into the DRAM 38 and then executes them on a process-by-process basis. The log management unit 105 and the log analysis unit 106 are programs stored in advance in the ROM 36 or the hard disk drives (HDD) 8 and 9.

When the process 101 needs a memory area for work during execution, the process 101 acquires some areas on the DRAM 38 and operates therein. When the DRAM 38 becomes exhausted, memory contents are temporarily saved on the hard disk drives 8 and 9 to realize a swapping function. In the following description, the acquisition of a memory area means an allocation of a storage area on the DRAM 38, and the simple word "memory" means the DRAM 38.

Moreover, although in the present embodiment, Linux (registered trademark) is used as an OS having a virtual memory management system, another multitask OS using a virtual management system may be used.

Actually, there are a plurality of processes 101, and a job such as printing is realized by a combination of a plurality of processes. A system having multiple functions is generally arranged to realize robustness and reusability of modules by separating processes as boundaries between modules. In a system with processes separated appropriately, there are processes associated with respective ones of various functions which a multifunction peripheral has, and when a job using a certain function is to be executed, a process corresponding to the function must be executed. When the granularity of a process is such that functions are subdivided, a plurality of processes are combined to realize a single function.

The process 101 always acquires a memory area required for execution thereof from the memory management unit 102. The memory management unit 102 provides a memory area on the DRAM 38 to the process 101.

Memory areas provided by the memory management unit 102 consist of two kinds of areas, i.e., a restricted area as a memory area in which swap-out is restricted, and a normal area as a normal memory area in which swap-out is not restricted. In the present embodiment, the restricted area is referred to as "high-speed memory", and the normal area is referred to as "low-speed memory" for the convenience of explanation.

The memory management unit 102 creates low-speed memory using, for example, a malloc system call, which is a universal function for a process to acquire a memory area managed by the OS. The memory management unit 102 creates swap-inhibited high-speed memory by adding a swap inhibit attribute to normally-created low-speed memory using a mlock system call, which is the function for notifying the OS that the memory is a swap-inhibited area.

Upon detecting memory exhaustion, the OS searches for a memory area suitable for carrying out swap-out from among memory areas targeted for swap. High-speed memory for which a swap-out inhibit attribute is set is excluded from the targets when the OS searches for a memory area targeted for swap, and hence swap-out of the high-speed memory is never executed. On the other hand, low-speed memory for which a swap-out inhibit attribute is not set becomes a target when the OS searches for a memory area targeted for swap, and hence swap-out may be carried out in the judgment of the OS.

The size distribution of high-speed memory and low-speed memory cannot be uniquely determined in the system design phase, and hence the memory management unit 102 reserves an area of high-speed memory upon request, and provides the same to the process 101.

The CPU load monitoring unit 104 monitors and manages the utilization of the CPU 33 in the overall system (image input-output apparatus 1) and the occupancy of the load on the CPU 33 with respect to each process 101. The utilization of the CPU 33 means, for example, the percentage of the time period during which running software occupies the CPU 33, and is also referred to as a processor utilization. The CPU load monitoring unit 104 has the function of notifying the memory management unit 102 of the utilization of the CPU 33 (CPU utilization) with respect to each process 101 in response to a query from the memory management unit 102. In a universal UNIX-like OS such as Linux, data on the CPU utilization can be acquired by reading a specific file on a proc file system.

FIG. 4 is a diagram showing contents of the priority table 103.

The priority table 103 is stored in the ROM 36 or the hard disk drive 8 or 9. In the priority table 103, processes are expressed in a list form as character string data that represents unique process names in the system. For each process, attribute information is described, and each process has any one of attributes "normal", "preferred", and "utility".

Character string data of "related preferred process" as related preferred process information, and numerical value data of "load threshold value" are associated with a utility process having the attribute "utility". The associated "related preferred process" is information indicative of a preferred process with which the utility process is executed in cooperation. The "related preferred process" identifies a preferred process executed in cooperation with the utility process.

Specifically, a utility process may be requested to execute processing by another process, that is, a utility process is a process executable in cooperation with another process. Thus, when there is processing commonly executed by a plurality of processes, a utility process is used to lump the processing as an independent process. Among "other processes" in this case, a process having the attribute "preferred" is a "related preferred process".

The "load threshold value" is a predetermined value for determining whether or not the load on the CPU 33 concerned with a related preferred process is high, and by comparing the same with a CPU load checked by the CPU load monitoring unit 104, it is determined whether or not a related preferred process places a high load.

In the example shown in FIG. 4, a print process is a utility process. A fax reception process and a copy process are a normal process and a preferred process, respectively. A related preferred process associated with the print process is the copy process, and the load threshold value is 80%.

Among items written in the priority table 103, items other than the attributes "preferred" and "normal" are items uniquely determined according to a process arrangement in the design phase. Whether or not a process is a utility process is uniquely determined in the design phase. The attribute ("preferred" or "normal") of a process that is not a utility process is determined by default with factory shipment of the image input-output apparatus 1.

It should be noted that in the priority table 103 shown in FIG. 4, the number of process names is not limited to three. Also, the number of processes whose attribute is "preferred", "normal", or "utility" is not limited to one, respectively. Also, although the load threshold value is 80% in the example, this value is not limited to the one. Moreover, the number of related preferred processes associated with one utility process is not limited to one.

The memory management unit 102 in FIG. 3 selectively provides the above described two kinds of memory, i.e., "high-speed memory" and "low-speed memory" by checking the priority table 103. The memory management unit 102 checks the process name of the process 101 as a memory area acquisition request source, and determines whether or not the process 101 is a preferred process. Actually, the memory management unit 102 operates as a library program in the form of being included in the process 101. Thus, the memory management unit 102 identifies the process name of the memory area acquisition request source by inquiring of the OS about the process name of the memory management unit 102 itself.

Figure 5:
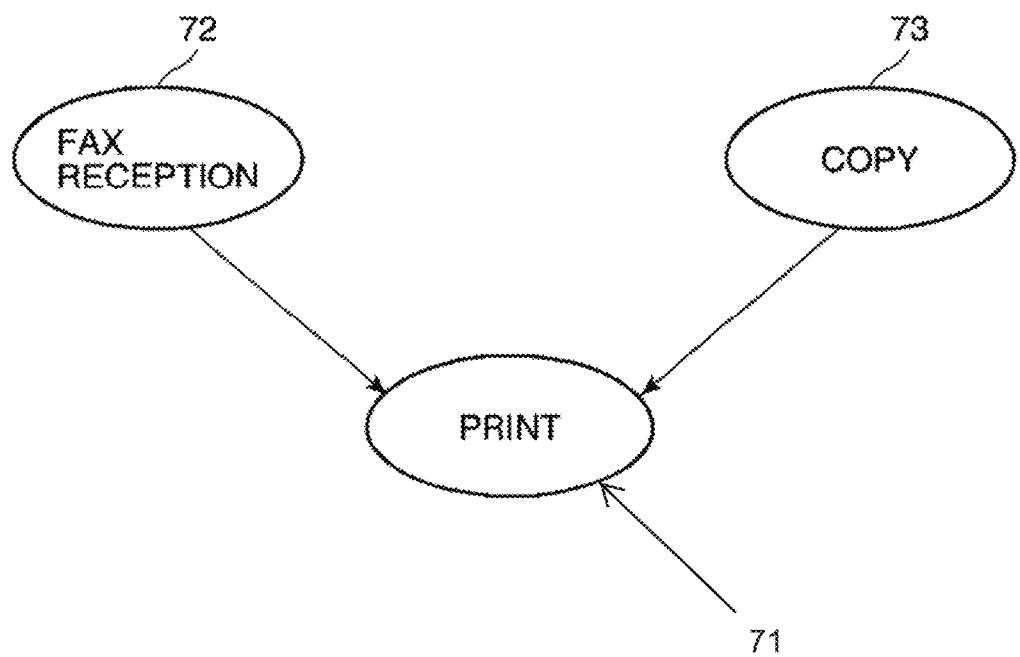
FIG. 5 is a conceptual diagram showing an exemplary process arrangement.

FIG. 5 is a conceptual diagram showing an exemplary process arrangement according to the present embodiment. In the arrangement shown in the figure, a print process 71 is a process for inputting image data and actually controlling the device to output a print. A fax reception process 72 has the function of receiving and outputting a fax, but after forming image data, requests the print process 71 to carry out subsequent actual output processing. A copy process 73 has the function of scanning and outputting an original, but after forming image data by scanning, requests the print process 71 to carry out subsequent actual output processing.

Specifically, the print process 71 is a process that is executed in cooperation with the fax reception process 72 and the copy process 73 when each of them is being executed. Thus, the print process 71 is a utility process that provides a printout function to both the fax reception process 72 and the copy process 73.

The process arrangement is not limited to the number and form shown in FIG. 5. For example, it can be assumed that a fax send process, a copy process, and a scan process are combined. In this case, the scan process is a utility process that is executed in cooperation with both the fax send process and the copy process.

Figure 6:
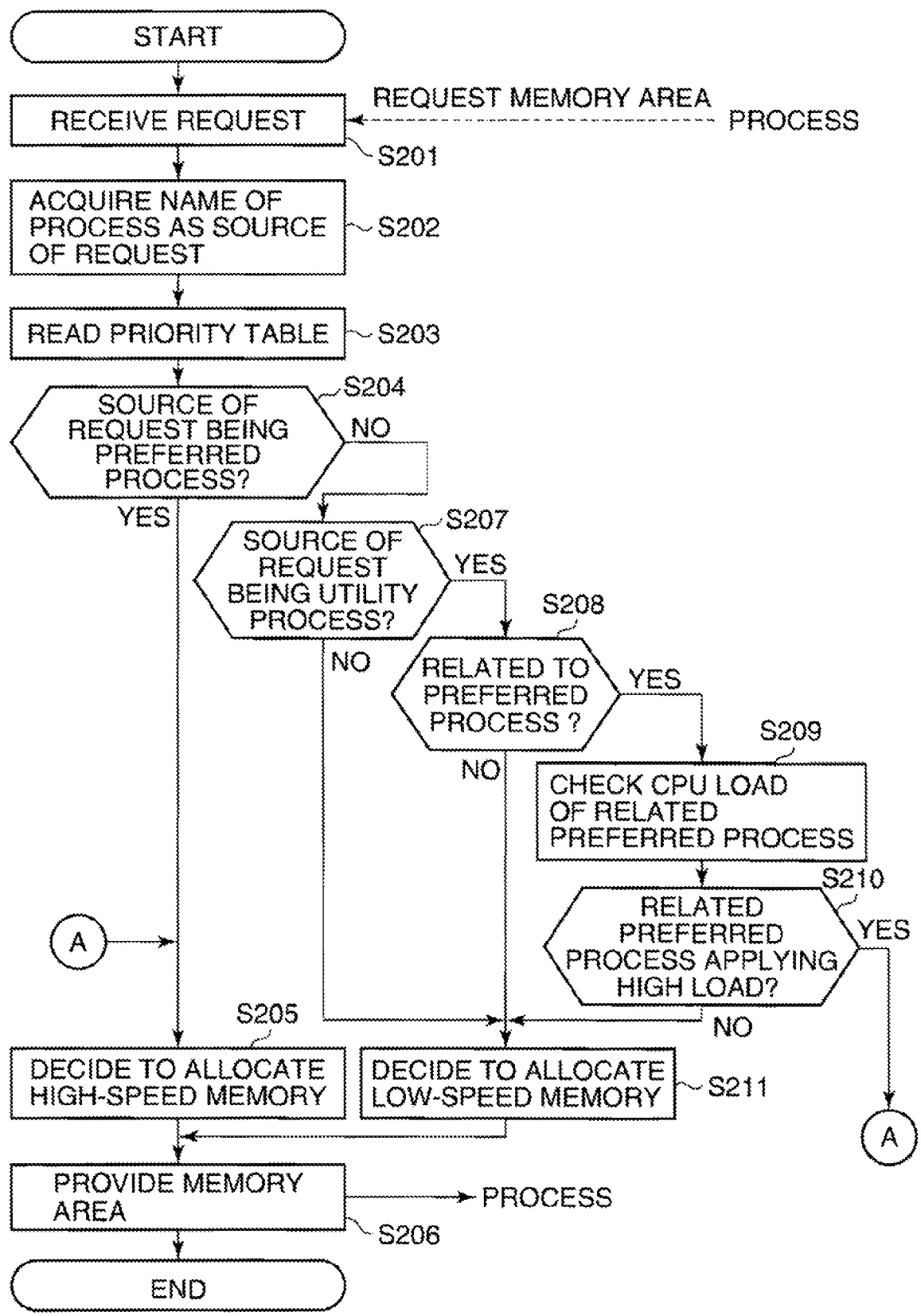
FIG. 6 is a flowchart showing a memory area providing process.

FIG. 6 is a flowchart showing memory area providing processing. By undergoing this processing, the process 101 acquires a memory area from the memory management unit 102 when executing a job.

First, in step S201, the memory management unit 102 receives a memory area acquisition request from the process 101, and proceeds the process to step S202 in response to the acquisition request. The process flow in FIG. 6 is constantly executed when the system is running. The memory area acquisition request can be made in arbitrary timing while a process or a job is running.

Next, in the step S202, the memory management unit 102 acquires a process name of the process 101 as a memory area acquisition request source by, for example, checking with the OS. At this time, the process name is acquired as character string data. Then, in step S203, the memory management unit 102 reads the priority table 103 (FIG. 4) from the ROM 36 or the hard disks 8 and 9 into the DRAM 38. The priority table 103 is acquired as an array of character string data.

Next, in the step S204, the memory management unit 102 refers to the priority table 103 to determine whether or not the process 101 as the memory area acquisition request source is a preferred process. Specifically, the memory management unit 102 checks whether or not the attribute "preferred" is associated with the process name representing the process 101 as the acquisition request source on the array of character string data acquired in the step S203.

When, as a result of the determination, the acquisition request source is a preferred process, the memory management unit 102 proceeds to step S205. In the step S205, the memory management unit 102 determines to allocate high-speed memory to the process 101 as the acquisition request source, and proceeds to step S206. In the step S206, the memory management unit 102 provides the process 101 as the acquisition request source with the memory area determined to be allocated, and terminates the process.

When, as a result of the determination in the step S204, the acquisition request source is not a preferred process, the memory management unit 102 proceeds to step S207. In the step S207, the memory management unit 102 refers to the priority table 103 to determine whether or not the process 101 as the acquisition request source is a utility process. Specifically, the memory management unit 102 checks whether or not the attribute "utility" is associated with the process name representing the process 101 as the acquisition request source.

When, as a result of the determination, the acquisition request source is a utility process, the memory management unit 102 proceeds to step S208. On the other hand, when, as a result of the determination, the acquisition request source is not a utility process, the memory management unit 102 proceeds to step S211 because it can be determined that the acquisition request source is a normal process. In the step S211, the memory management unit 102 determines to allocate low-speed memory to the process 101 as the acquisition request source, and proceeds to the step S206. In the step S206, the memory management unit 102 provides the process 101 as the acquisition request source with the memory area determined to be allocated, and terminates the process.

In the step S208, the memory management unit 102 determines whether or not the utility process as the acquisition request source has a related preferred process (whether or not there is a related preferred process). When, as a result of the determination, the utility process does not have a related preferred process, the memory management unit 102 executes the processing in the step S211 and the subsequent steps because there is no need to check the load on the CPU 33 (CPU load). Thus, low-speed memory is provided to the utility process that does not have a related preferred process (step S206). On the other hand, when the utility process as the acquisition request source has a related preferred process, the memory management unit 102 proceeds to step S209.

In the step S209, the memory management unit 102 makes an inquiry to the CPU load monitoring unit 104 (FIG. 3) and checks the CPU load associated with the related preferred process which the utility process has. In subsequent step S210, the memory management unit 102 determines whether or not the CPU load associated with the related preferred process is high. Specifically, the memory management unit 102 determines whether or not the CPU load found in the step S209 exceeds a load threshold value (for example, 80%) for a related preferred process prescribed in the priority table 103.

When, as a result of the determination, the CPU load associated with the related preferred process is a high load exceeding the load threshold value, the memory management unit 102 executes the processing in the step S205 and the subsequent steps. Thus, high-speed memory is provided to the utility process that has a related preferred process that places a high load on the CPU 33 (step S206). On the other hand, when the CPU load does not exceed the load threshold value, the memory management unit 102 executes the processing in the step S211 and the subsequent steps because it is necessary to run the utility process with low priority. Thus, low-speed memory is provided to the utility process that has a related preferred process that does not place a heavy load on the CPU 33 (step S206).

The process 101 as the acquisition request source acquires the memory area provided by the memory management unit 102 in the step S206. Then, on a condition that the memory area has been successfully acquired, the process 101 terminates the process for acquiring the memory area. The process 101 can use a memory area automatically provided according to a situation without a need to switch processing according to whether or not swap-out of a memory area to be acquired is inhibited.

For example, assume that in the process arrangement shown in FIG. 5, the copy process 73 is preferentially used, and the fax reception process 72 is nonpreferentially used. When the print process 71 is a normal process as distinct from the example shown in FIG. 4, low-speed memory is always allocated to the print process 71. Thus, when the print process 71 is executed in cooperation with the preferentially-used copy process 73, an output operation is carried out at low speed, and hence the copy function is executed slowly.

On the other hand, when the print process 71 is a preferred process as distinct from the example shown in FIG. 4, high-speed memory is always allocated to the print process 71. Thus, when the print process 71 is executed in cooperation with the nonpreferentially-used fax reception process 72, an output operation as well is carried out at high speed. For this reason, more resources of the CPU 33 than necessary are taken up, which leads to degradation of the performance of the system as a whole.

However, when the print process 71 is configured as a utility process in the priority setting as shown in FIG. 4, high-speed memory is allocated to the print process 71 when the copy process 73 as a related preferred process occupies the resources of the CPU 33. Thus, the print process 71 can preferentially execute output processing requested by the copy process 73. On the other hand, when the fax reception process 72 that is not a related preferred process is executed, low-speed memory is allocated to the print process 71. Thus, output processing requested by the fax reception process 72 is nonpreferentially executed.

As a result, the copy function is executed at high speed, and more resources of the CPU 33 than necessary are not taken up during the operation of the fax reception process 72, so that the throughput of the system as a whole can be enhanced.

Incidentally, the priority table 103 (FIG. 4) may be used the way it is factory-configured, but whether processes that are not utility processes have the attribute "preferred" or "normal" may be dynamically set as described below.

Specifically, because the process 101 desired to be preferentially used differs from user to user in a strict sense, and thus preferably dynamically changed from user to user. For example, when the process 101 that is frequently used is set as a preferred process with reference to a user's usage history and log, functions that are frequently used are executed at high speed, and functions that are infrequently used are executed at low speed, and hence the throughput of the system as a whole is enhanced.

As shown in FIG. 3, whenever the process 101 executes a job, it notifies the log management unit 105 of this. The log management unit 105 records in the log file 107 a job execution history for each process as an execution history of each process. Incidentally, the log file 107 is stored in the DRAM 38 (FIG. 2), updated whenever necessary, and stored in the hard disks 8 and 9 at the exit of the system. Then, at the next and subsequent start of the system, the log file 107 is read from the hard disks 8 and 9 into the DRAM 38 and updated as mentioned above.

The log analysis unit 106 analyzes the log file 107 in arbitrary timing, and identifies the process 101 that has been frequently executed. When the attribute of the identified frequently-executed process 101 on the priority table 103 is "normal", the log analysis unit 106 rewrites it to "preferred", and when the attributes of the other processes are "preferred", the log analysis unit 106 rewrites them to "normal". In this example, the number of preferred processes is limited to one, but a plurality of preferred processes may be set when the performance, the amount of memory, etc. of the CPU 33 are abundant. Such a rewriting operation is executed in concurrently with and independently of the flowchart in FIG. 6.

Incidentally, because a standard preferred process is factory-written in the priority table 103 as described above, the user can use the apparatus in order of priority optimized to a certain extent from the first usage.

According to the present embodiment, when a source of memory area acquisition request is a utility process having a related preferred process, high-speed memory is allocated to the utility process only when the CPU load associated with the related preferred process exceeds the load threshold value. Otherwise, low-speed memory is allocated to the utility process. As a result, delayed processing of the utility process can be prevented when the CPU 33 is heavily loaded, and the priority of a normal process can be prevented from needlessly increasing. Thus, the overall processing speed can be increased while the CPU 33 is prevented from becoming overloaded.

Moreover, the attributes "preferred" and "normal" of processes that are not utility processes in the priority table 103 (FIG. 4) are rewritten according to usage histories of the processes. As a result, allocation priorities of memory areas can be efficiently determined, and memory can be allocated in an optimum manner according to the status of use. Thus, the user can use each function at the optimum throughput due to memory management optimized according to the status of use.

It should be noted that although the priority table 103 (FIG. 4) includes attribute information, related preferred process information, and load threshold information, these pieces of information have only to be associated with each process name, and do not have to be stored in an integrated manner in tabular form.

Moreover, although in the present embodiment, the DRAM 38 is managed in two separate areas, i.e., a high-speed memory area and a low-speed memory area, and the memory management unit 102 allocates either of these two areas in response to a request from the process 101, but any other method may be used. Specifically, the memory management unit 102 may not divide the DRAM 38 into a high-speed memory area and a low-speed memory area, and may allocate an area in the DRAM 38 in response to a request from the process 101 and use the allocated area as a swap-out inhibited area and a swap-out uninhibited area.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-042224 filed Feb. 25, 2009, which is hereby incorporated by reference herein in its entirety.

What is claimed is:

1. An information processing apparatus that includes a processor capable of executing a plurality of processes, a primary storage device, storing one or more processes, and a secondary storage device, to which processes can be swapped out, from the primary storage device to the secondary storage device, the plurality of processes including one or more of a preferred process of which swap-out is restricted, a normal process of which swap-out is not restricted and a utility process that is executable in cooperation with either a normal process or a preferred process, the information processing apparatus comprising:

a receiving unit adapted to receive an acquisition request for a memory area in the primary storage device from a requesting process executed by the processor;

a determining unit adapted to determine whether the requesting process that has made the acquisition request received by said receiving unit is the utility process; and a control unit adapted to provide control so as to, when said determining unit determines that the requesting process that has made the acquisition request received by said receiving unit is the utility process executable in cooperation with the another process, and the another process cooperating with the utility process executed by the processor is a preferred process of which swap-out is restricted, also restrict swap-out of the utility process, wherein the control unit further provides, in a case where a processor utilization of the preferred process of which swap-out is restricted is greater than a predetermined value, control so as to restrict the swap-out of the utility process.

2. An information processing apparatus according to claim 1, wherein said determining unit determines whether the process that has made the acquisition request received by said receiving unit is the utility process based on attribute information of the process, defining whether a process executable by the processor is the utility process, the preferred process, or the normal process of which swap-out is not restricted.

3. An information processing apparatus according to claim 1, wherein the primary storage device includes a restricted area of which swap-out is restricted, and a normal area of which swap-out is not restricted, and said control unit allocates the memory area included in the restricted area of the primary storage device to the preferred process, and the utility process of which swap-out should be restricted.

4. An information processing apparatus according to claim 1, wherein said control unit provides control so as not to restrict swap-out of the utility process when said determining unit determines that the process that has made the acquisition request received by said receiving unit is the utility process executable in cooperation with another process, and the another process cooperating with the utility process executed by the processor is not a preferred process of which swap-out is restricted.

5. An information processing apparatus according to claim 1, wherein the primary storage device includes a restricted area of which swap-out is restricted, and a normal area of which swap-out is not restricted, and said control unit allocates a memory area included in the normal area of the primary storage device to the preferred process, and the utility process of which swap-out is not restricted.

6. A virtual storage management method in an information processing apparatus that includes a processor capable of executing a plurality of processes, a primary storage device, storing one or more processes, and a secondary storage device, to which processes can be swapped out to the secondary storage device, from the primary storage device, the plurality of processes including one or more of a preferred process of which swap-out is restricted, a normal process of which swap-out is not restricted and a utility process that is executable in cooperation with either a normal process or a preferred process, the method comprising:

a receiving step of receiving an acquisition request for a memory area in the primary storage device from a requesting process executed by the processor;

a determining step of determining whether the requesting process that has made the acquisition request received in said receiving step is the utility process; and a control step of providing control so as to when it is determined in said determining steps that the requesting process that has made the acquisition request received in said receiving step is a utility process executable in cooperation with the another process, and the another process cooperating with the utility process executed by the processor is a preferred process of which swap-out is restricted, also restrict swap-out of the utility process, wherein the control step further provides, in a case where a processor utilization of the preferred process of which swap-out is restricted is greater than a predetermined value, control so as to restrict the swap-out of the utility process.

7. A non-transitory computer-readable storage medium storing a program for causing a computer to execute a virtual storage management method in an information processing apparatus that includes a processor capable of executing a plurality of processes, a primary storage device, storing one or more processes, and a secondary storage device, to which processes can be swapped out, from the primary storage device to the secondary storage device, the plurality of processes including one or more of a preferred process of which swap-out is restricted, a normal process of which swap-out is not restricted and a utility process that is executable in cooperation with either a normal process or a preferred process, the method comprising:

a receiving step of receiving an acquisition request for a memory area in the primary storage device from a requesting process executed by the processor;

a determining step of determining whether the requesting process that has made the acquisition request received in said receiving step is a utility process; and a control step of providing control so as to when it is determined in said determining steps that the requesting process that has made the acquisition request received in said receiving step is the utility process executable in cooperation with the another process, and the another process cooperating with the utility process executed by the processor is the preferred process of which swap-out is restricted, also restrict swap-out of the utility process, wherein the control step further provides, in a case where a processor utilization of the preferred process of which swap-out is restricted is greater than a predetermined value, control so as to restrict the swap-out of the utility process.

* * * * *